United States Patent Office 2,861,991
Patented Nov. 25, 1958

2,861,991

SUBSTITUTED BENZOXAZINES

Raymond H. Rigterink, Midland, Mich., assignor to The Dow Chemical Company, Midland, Mich., a corporation of Delaware No Drawing. Application September 3, 1957
Serial No. 681,452

7 Claims. (Cl. 260—244)

This invention concerns certain new substituted benzoxazines, and particularly certain 6-lower alkyl-3-(cyclohexylcyclohexyl)-3,4-dihydro-2H-1,3-benzoxazines having a structure corresponding to the formula

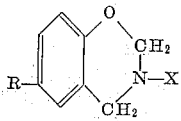

In this and succeeding formulae, R represents hydrogen or lower alkyl, and X represents a cyclohexylcyclohexyl radical. The expression lower alkyl is employed in the present specification and claims to represent an alkyl radical containing from 1 to 5 carbon atoms, inclusive. These new compounds are viscous oils or crystalline solids somewhat soluble in many common organic solvents and of very low solubility in water. They are useful as parasiticides and are adapted to be employed for the control of many agricultrual and household pests such as nematodes and insects.

The new compounds may be prepared by causing bicyclohexylamine to react with formaldehyde or a formaldehyde-yielding substance, to form a formaldehyde-amine condensation product, and thereafter reacting the said product with a phenolic compound having the formula:

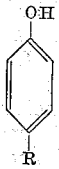

to produce the desired benzoxazine and water of reaction.

In carrying out the first step of the reaction, the (bi-cyclohexyl)amine is intimately contacted with formaldehyde or a formaldehyde-yielding substance in an inert solvent such as methanol, ethanol or dioxane as reaction medium. The contacting of the reactants is carried out with stirring and cooling and at a temperature of from 0° to 70° C. Good results are obtained when reacting one molecular proportion of the (bicyclohexyl)amine with two molecular proportions of formaldehyde. The formaldehyde may be employed in any readily available form such as formalin or paraformaldehyde. The amount of formaldehyde is calculated on the basis of the monomer unit.

In an alternative method of operation the amine may be employed as its hydrochloride salt. In such operation one molecular proportion of the salt is contacted with one molecular proportion of an alkali metal hydroxide and two molecular proportions of formaldehyde. In such procedure the amine is formed in situ in the reaction mixture from the reaction of the salt and alkali metal hydroxide.

In carrying out the second step of the reaction, the phenolic compound or a solution thereof in inert solvent is added portionwise to the reaction mixture prepared as described above. In such operations, one molecular proportion of phenolic compound is employed for each molecular proportion of (bicyclohexyl)-amine used in the preparation of the intermediate formaldehyde-amine product. The reaction takes place smoothly within the temperature range of from 30° to 100° C. with the production of the desired product and water of reaction. Upon completion of the reaction, the reaction mixture may be fractionally distilled under reduced pressure to remove the low boiling constituents and obtain the desired product as a liquid or crystalline residue. The product may be purified in conventional fashion such as by washing with dilute aqueous alkali and water, and recrystallization from various organic solvents.

The following examples merely illustrate the invention but are not to be construed as limiting:

*Example 1.* — *3-(2-cyclohexylcyclohexyl)-3,4-dihydro-6-methyl-2H-1,3-benzoxazine*

90.6 grams (0.5 mole) of (bicyclohexyl)-2-amine (boiling at 270° C. at atmospheric pressure) was added portionwise with stirring over a period of 15 minutes, to a solution of 30 grams (1.0 mole) of paraformaldehyde, and 0.5 gram potassium hydroxide in 200 milliliters of ethanol. The reaction vessel was continuously cooled during the addition to maintain the temperature in the range of 25°–30° C. Upon completion of the addition, 54 grams (0.5 mole) 4-cresol was added in a single portion to the reaction mixture and the resulting mixture heated with stirring under reflux for two hours at a temperature of approximately 80° C. Alcohol solvent was thereafter removed by evaporation at atmospheric pressure and the resulting mixture diluted with 250 milliliters of toluene, 250 milliliters of water, and 25 milliliters of aqueous 50 percent sodium hydroxide. During the dilution, the mixture divided into an aqueous and an organic layer. The organic layer was separated and concentrated by distillation under reduced pressure at gradually increasing temperatures to a temperature of 100° C. at 10 millimeters pressure. As a result of these operations there was obtained a 3-(2-cyclohexylcyclohexyl)-3,4-dihydro-6-methyl-2H-1,3-benzoxazine product as a viscous liquid having a refractive index $n/D$ of 1.5387 at 25° C. This product was soluble in petroleum ether, ethyl acetate, and toluene and only slightly soluble in ethanol.

*Example 2.*—*3-(2-cyclohexylcyclohexyl)-6-(1,1-dimethylpropyl)-3,4-dihydro-2H-1,3-benzoxazines*

90.6 grams (0.5 mole) of bicyclohexyl-2-amine (boiling at 270° C.) was added portionwise with stirring during 15 minutes to a solution of 30 grams (1.0 mole) of paraformaldehyde and 0.5 gram potassium hydroxide in 200 milliliters of ethanol. The reaction vessel was continuously cooled during the addition to maintain a temperature in the range of 25°–30° C. Thereupon, 82.1 grams (0.5 mole) of 4-(1,1-dimethylpropyl)phenol was added with stirring and the solution heated under reflux at approximately 80° C. for two hours. The reaction mixture was thereafter processed exactly as described in Example 1 to obtain a 3-(2-cyclohexylcyclohexyl)-6-(1,1-dimethylpropyl)-3,4-dihydro-2H-1,3-benzoxazine product as a viscous oily material having a refractive index of 1.5350 at 25° C. This product was very soluble in petroleum ether, boiling ethanol, ethyl acetate, and toluene.

*Example 3.*—*6-tertiary-butyl-3-(2-cyclohexylcyclohexyl)-3,4-dihydro-2H-1,3-benzoxazine*

181.2 grams (1 mole) of (bicyclohexyl)-2-amine (boiling at 270° C.) was added portionwise with stirring during fifteen minutes to a solution of 60 grams (2 moles) of paraformaldehyde and 1 gram potassium hydroxide in 150 milliliters of methanol. The reaction vessel was continuously cooled during the addition to maintain the temperature in the range of from 25°–30° C. 150.2 grams (1 mole) 4-tert-butyl-phenol was thereupon added, with stirring. Stirring was thereafter continued and the mixture was heated under reflux at 75° C. for two hours. Methanol solvent was thereafter removed by distillation under atmospheric pressure, and the resulting mixture diluted with 500 milliliters of aqueous 5 percent sodium hydroxide solution and 250 milliliters of toluene. During the dilution, the mixture divided into an aqueous and an organic layer. The organic layer was separated and concentrated by distillation under reduced pressure at gradually increasing temperatures up to a temperature of 100° C. at 10 millimeters pressure. As a result of these operations there was obtained a 6-tertiary-butyl-3(2-cyclohexylcyclohexyl)-3,4-dihydro-2H-1,3-benzoxazine product as a viscous liquid having a refractive index $n/D=1.5334$ at 25° C. This product was soluble in petroleum ether, boiling ethanol, ethyl acetate and toluene.

*Example 4.—3-(4-cyclohexylcyclohexyl)-3,4-dihydro-6-methyl-2H-1,3-benzoxazine*

21.8 grams (0.1 mole) of (bicyclohexyl)-4-amine hydrochloride (melting at 295°–300° C.) was added portionwise at room temperature with stirring to a mixture of 6.0 grams (0.2 mole) paraformaldehyde and 4.0 grams (0.1 mole) sodium hydroxide in 100 milliliters of ethanol. Upon completion of the addition, 10.8 grams (0.1 mole) 4-cresol was added to the reaction mixture with stirring, and the resulting mixture heated with stirring under reflux at approximately 73° C. for two hours. Thereafter, most of the ethanol was removed by evaporation at atmospheric pressure, and the resulting mixture was diluted with 100 milliliters of toluene, 10 milliliters of aqueous 50 percent sodium hydroxide and 200 milliliters of water, with vigorous stirring. The mixture thereafter divided into aqueous and organic layers, and the organic layer was separated and concentrated by distillation at gradually increasing temperatures up to a temperature of 100° C. at 10 millimeters pressure. As a result of these operations there was obtained as a residue, a viscous brown liquid layer wherein crystals slowly formed. These crystals were thereafter removed by filtration, and recrystallized from hot ethyl acetate and washed with a small portion of ice cold ethyl acetate to yield a 3-(4-cyclohexylcyclohexyl) - 3,4 - dihydro - 6 - methyl - 2H - 1,3 - benzoxazine product of white crystals with a melting point of 100°–101° C.

*Example 5.—3-(4-cyclohexylcyclohexyl)-6-(1,1-dimethylpropyl)-3,4-dihydro-2H-1,3-benzoxazine*

21.8 grams (0.1 mole) of (bicyclohexyl)-4-amine hydrochloride (melting point 295°–300° C.) was added portionwise at room temperature with stirring to a mixture of 6.0 grams (0.2 mole) paraformaldehyde and 4.0 grams (0.1 mole) of sodium hydroxide, in 100 milliliters of ethanol. 4-(1,1-dimethylpropyl)phenol (16.4 grams; 0.1 mole) was added with stirring to the reaction mixture. The resulting mixture was then heated under reflux at approximately 78° C. for two hours to complete the reaction. Ethanol solvent was thereafter removed by evaporation under atmospheric pressure, and the resulting mixture diluted with stirring with 100 milliliters of toluene, 10 milliliters aqueous 50 percent sodium hydroxide, and 200 milliliters of water. Following the dilution, the mixture divided into an aqueous and an organic layer. The organic layer was separated and concentrated by distillation under reduced pressure at gradually increasing temperatures up to 100° C. at 10 millimeters pressure. As a result of these operations there was obtained a 3-(4-cyclohexylcyclohexyl) - 6 - (1,1 - dimethylpropyl) - 3,4 - dihydro-2H-1,3-benzoxazine product as a resin, readily soluble in petroleum ether, toluene, and ethyl acetate. 3 - (4 - cyclohexylcyclohexyl) - 6 - (1,1 - dimethylpropyl)-3,4-dihydro-2H-1,3-benzoxazine has a molecular weight of 369.4.

*Example 6.—3-(4-cyclohexylcyclohexyl)-6-(1,1-dimethylpropyl)-3,4-dihydro-2H-1,3-benzoxazine*

(Bicyclohexyl)-4-amine hydrochloride (21.8 grams; 0.1 mole) having a melting point of 228°–232° C. is added portionwise at room temperature with stirring to a mixture of 6.0 grams (0.2 mole) of paraformaldehyde and 4.0 grams (0.1 mole) of sodium hydroxide in 100 milliliters of ethanol. 4-(1,1-dimethylpropyl)phenol (16.4 grams; 0.1 mole) is added with stirring to the above reaction mixture. The resulting mixture is then heated under reflux at approximately 78° C. for two hours and thereafter processed as described in Example 5 to obtain a 3-(4-cyclohexylcyclohexyl)-6-(1,1-dimethylpropyl)-3,4-dihydro-2H-1,3-benzoxazine product as a solid residue readily soluble in petroleum ether, toluene, and ethyl acetate. 3-(4-cyclohexylcyclohexyl)-6-(1,1-dimethylpropyl)-3,4-dihydro-2H-1,3-benzoxazine has a molecular weight of 369.4.

The new benzoxazines of the present invention have been found to be useful as parasiticides and are adapted to be employed for the control of many pests. For such use, the products may be dispersed on inert finely divided solids and employed as dusts. Also, such mixtures may be dispersed in water with the aid of a wetting agent and the resulting aqueous suspensions used as sprays. In other procedures, the products may be employed in oil, as oil-in-water emulsions, or as water dispersions with or without the aid of dispersing or emulsifying agents. In a representative operation, 6-tert-butyl-3-(2-cyclohexylcyclohexyl)-3,4-dihydro-2H-1,3-benzoxazine was employed for the control of Mexican Bean Beetles. In such operation, the application of aqueous compositions containing 0.24 percent by weight of the said substituted benzoxazine product as a foilage spray to bean plants heavily infested with Mexican Bean Beetles resulted in 90 percent mortality of the test organism within 72 hours.

The (bicyclohexyl)-4-amine employed as a starting material in the present invention occurs in two isomeric forms known as the alpha and beta isomers. These two isomers may be prepared by known methods. In such methods, cyclohexylcyclohexanol is dehydrogenated over a copper catalyst at 300° C. to form cyclohexylcyclohexanone, and this product is thereafter ammoniated to form a 4-cyclohexylcyclohexanone amine. The latter is thereafter hydrogenated over a nickel catalyst at 60° C. and 75 pounds pressure per square inch to give a reaction mixture containing about equal amounts of the alpha and beta isomers of the (bicyclohexyl)-4-amine. The hydrogen chloride salt of the beta isomer of the amine is soluble in chloroform while the hydrogen chloride salt of the alpha isomer of the amine is substantially insoluble in chloroform. Thus, the isomeric amines may be separated in the form of their hydrogen chloride salts, and the salts thereafter converted to the free amine. The hydrogen chloride salts of the alpha and beta isomers of the amine melt at 295°–300° C. and 228°–232° C., respectively, while the alpha isomer of the amine melts at 58°–62° C. and the beta isomer of the amine melts at 32° C.

Bicyclohexyl-2-amine may be prepared by known methods wherein 2-cyclohexylcyclohexanone oxime is reduced with sodium and ethanol. In such operations, the 2-cyclohexylcyclohexanone oxime is dissolved in ethanol and the resulting solution heated portionwise with an excess of sodium. Upon completion of the reaction, the reaction mixture is diluted with an equal volume of water and acidified with hydrochloric acid. The mixture is thereafter concentrated by distillation under reduced pressure. During such concentration, a bicyclohexyl-2-amine product precipitates in the mixture in the form of the hydrochloride salt. This salt may be dispersed in a suitable solvent such as water and the resulting mixture neutralized with sodium hydroxide to convert the salt to the free amine. The free amine may be separated by fractional distillation under reduced pressure and boils at 270° C. at atmospheric pressure.

I claim:

1. A compound corresponding to the formula

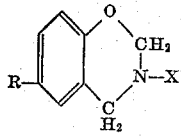

wherein R represents a member selected from the group consisting of hydrogen and lower alkyl, and X represents a member selected from the group consisting of 2-cyclohexylcyclohexyl and 4-cyclohexylcyclohexyl.

2. 3-(2-cyclohexylcyclohexyl)-3,4-dihydro - 6 - methyl-2H-1,3-benzoxazine.

3. 3-(2-cyclohexylcyclohexyl)-6-(1,1-dimethylpropyl)-3,4-dihydro-2H-1,3-benzoxazine.

4. 6-tertiary-butyl - 3 - (2-cyclohexylcyclohexyl)-3,4-dihydro-2H-1,3-benzoxazine.

5. 3-(4-cyclohexylcyclohexyl)-3,4-dihydro - 6 - methyl-2H-1,3-benzoxazine.

6. 3-(4-cyclohexylcyclohexyl)-6-(1,1-dimethylpropyl)-3,4-dihydro-2H-1,3-benzoxazine.

7. A method for the preparation of a 6-lower-alkyl-3-(cyclohexylcyclohexyl)-3,4-dihydro-2H-1,3-benzoxazine comprising the steps of (1) reacting formaldehyde with a member of the group consisting of bicyclohexyl-2-amine and bicyclohexyl-4-amine to form a bicyclohexylamine-formaldehyde condensation product and (2) reacting said condensation product with a 4-lower alkylphenol.

References Cited in the file of this patent
UNITED STATES PATENTS 2,806,031   Rigterink _____ Sept. 10, 1957